(12) United States Patent
Lee

(10) Patent No.: US 12,741,535 B2
(45) Date of Patent: Sep. 22, 2026

(54) DIGITAL VEHICLE DISPLAY SYSTEMS AND SYSTEMS FOR MOUNTING THE SAME

(71) Applicant: Seok-Ho Gary Lee, Las Vegas, NV (US)

(72) Inventor: Seok-Ho Gary Lee, Las Vegas, NV (US)

( * ) Notice: Subject to any disclaimer, the term of this patent is extended or adjusted under 35 U.S.C. 154(b) by 0 days.

(21) Appl. No.: 18/803,117

(22) Filed: Aug. 13, 2024

(65) Prior Publication Data

US 2024/0399871 A1 Dec. 5, 2024

Related U.S. Application Data

(63) Continuation-in-part of application No. 17/483,257, filed on Sep. 23, 2021, now abandoned.

(51) Int. Cl.
*B60K 35/53* (2024.01)
*B60K 35/60* (2024.01)
*B60K 35/81* (2024.01)

(52) U.S. Cl.
CPC .............. *B60K 35/53* (2024.01); *B60K 35/60* (2024.01); *B60K 35/81* (2024.01); *B60K 2360/1523* (2024.01); *B60K 2360/178* (2024.01); *B60K 2360/46* (2024.01); *B60K 2360/785* (2024.01); *B60K 2360/816* (2024.01); *B60R 2300/40* (2013.01)

(58) Field of Classification Search
CPC .............. B60K 35/60; B60K 2360/785; B60K 2360/816; B60R 2300/40; G06T 2207/30252
USPC .......................................................... 348/837
See application file for complete search history.

(56) References Cited

U.S. PATENT DOCUMENTS

| | | | | |
|---|---|---|---|---|
| 9,260,056 B2 * | 2/2016 | Strout | B60S 1/0491 |
| 9,585,265 B2 * | 2/2017 | Ganim | G09F 9/33 |
| 2014/0040016 A1 * | 2/2014 | Amla | G06Q 30/0267 705/14.63 |
| 2016/0368416 A1 * | 12/2016 | Nemitz | B60Q 1/52 |
| 2021/0319477 A1 * | 10/2021 | Malihy | H04W 4/029 |

FOREIGN PATENT DOCUMENTS

CN 222474089 U * 2/2025

* cited by examiner

*Primary Examiner* — Justin W Rider

(57) ABSTRACT

A display screen mount for automobiles may include a set of mounting brackets, wherein each mounting bracket is configured to be affixed at one end to an automobile and at another end to a display screen such that, when the display screen is mounted inside the automobile, graphics displayed on the display screen are visible outside the automobile. Various other methods, systems, and computer-readable media are also disclosed.

20 Claims, 15 Drawing Sheets

DIGITAL VEHICLE DISPLAY SYSTEMS AND SYSTEMS FOR MOUNTING THE SAME

CROSS-REFERENCE TO RELATED APPLICATION

This application is a continuation-in-part of, and claims the benefit of priority of, U.S. application Ser. No. 17/483,257, filed 23 Sep. 2021, the content of which is incorporated herein by reference in its entirety.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
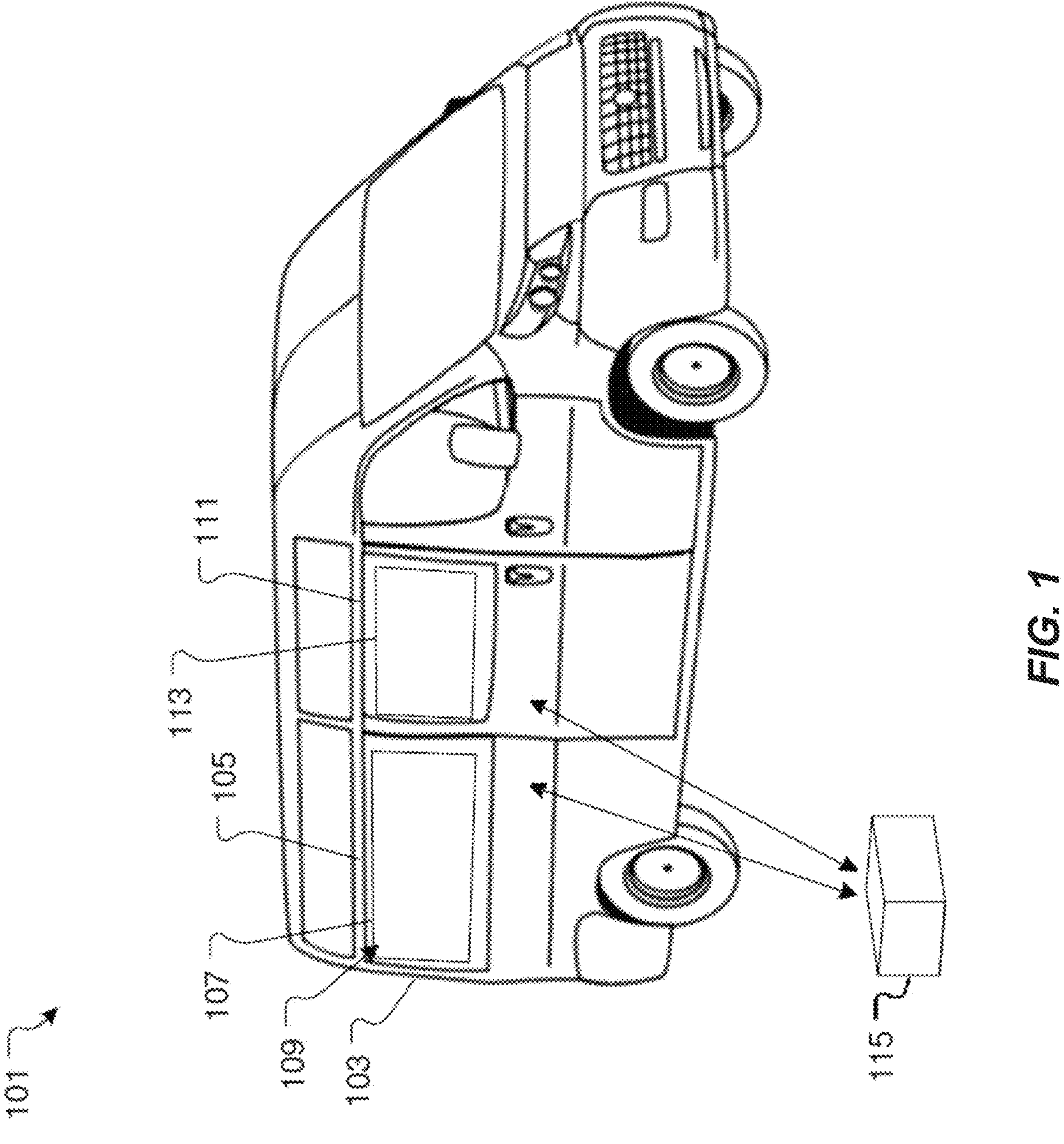
FIG. 1 is a perspective view of a digital vehicle display system in accordance with one embodiment of the present application.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

Features from any of the embodiments described herein may be used in combination with one another in accordance with the general principles described herein. These and other embodiments, features, and advantages will be more fully understood upon reading the following detailed description in conjunction with the accompanying drawings and claims.

DETAILED DESCRIPTION OF EXEMPLARY EMBODIMENTS

The present disclosure relates generally to communication systems and methods, and more specifically, to a digital vehicle display system that places transparent liquid crystal displays (LCD), transparent light emitting diode (LED) displays, transparent organic light emitting diode (OLED) displays, transparent LED-embedded glass displays, or similar see-through displays on window surfaces (e.g., the interior or the exterior) of any vehicle, such as automobiles, airplanes, trains, ships, and the like ("Vehicular Mobility Platforms") in private, commercial, public safety, or military capacity so that messages and imagery in informative (public-safety), instructive (public-service), and commercial nature are displayed by them but do not block the visibility through the windows. Similarly, non-transparent LCDs, non-transparent LEDs, non-transparent OLEDs, or non-transparent LED-embedded glass displays may be attached to non-window surfaces of a vehicle to communicate messages from the vehicle.

Communication systems are effective means to share ideas, concepts, entertainment, and other material between two parties. Common communication systems include telephones and computers that allow for verbal thoughts or messages from one person to be converted to electronic signals and then sent through a wire or network to another person who is able to listen to or read the thought or message expressed by the first person. Common communication systems also include advertisements or imagery that are placed where they will be seen by people as they move by. The advertisements can be instructive or commercial in nature.

One of the problems frequently associated with common communication systems is their limited use. For example, a telephone requires that the first person know the number, address, or extension of a second person they want to communicate with. Without this number no communication is possible. When in a crowd, on a road, or in other situations where communication is desired but unable to be established between two parties, they are left with no remedy to communicate.

While existing communication systems include displays that can be attached to surfaces or can stand-alone, these displays are non-transparent or opaque. As such, when these displays are attached to a window in a building or a vehicle, vision or sight through the window is reduced or eliminated completely. Additionally, spaces such as windows where communications could be placed are not able to be utilized as it would restrict the purpose of the window, which is to allow light through or to be looked through. Accordingly, although great strides have been made in the area of communication systems, many shortcomings remain.

Illustrative embodiments of the disclosed system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The systems and methods of use of the present application overcome one or more of the above-discussed problems commonly associated with conventional communication systems. Specifically, the present disclosure enables indirect communication between two parties on roads and in other crowded places where direct communication is limited. Additionally, this disclosure allows for the use of windows for visual communication without restricting the vision therethrough in one direction. These and other unique features of the disclosed system and method of use are discussed below and illustrated in the accompanying drawings.

The disclosed system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The embodiments herein described are not intended to be exhaustive or to limit the invention to the precise form disclosed. It is chosen and described to explain the principles of the invention and its application and practical use to enable others skilled in the art to follow its teachings.

Referring now to the drawings, where like reference characters identify corresponding or similar elements throughout the several views, FIG. 1 depicts a perspective view of a digital vehicle display system in accordance with an embodiment of the present application. It will be appreciated that system 101 overcomes one or more of the above-listed problems commonly associated with conventional communication systems.

In an example embodiment, system 101 includes a vehicle 103, which may represent an automobile, train, boat, or the like, with a first window 105 having a first display 107 that is attached thereto and that is visible from the outside surface 109 of the vehicle 103. The system also includes a second window 111 with a second display 113 that is attached thereto and that is visible from the outside surface 109 of the vehicle 103. A control module 115 is in digital communication with the displays.

Figure 2:
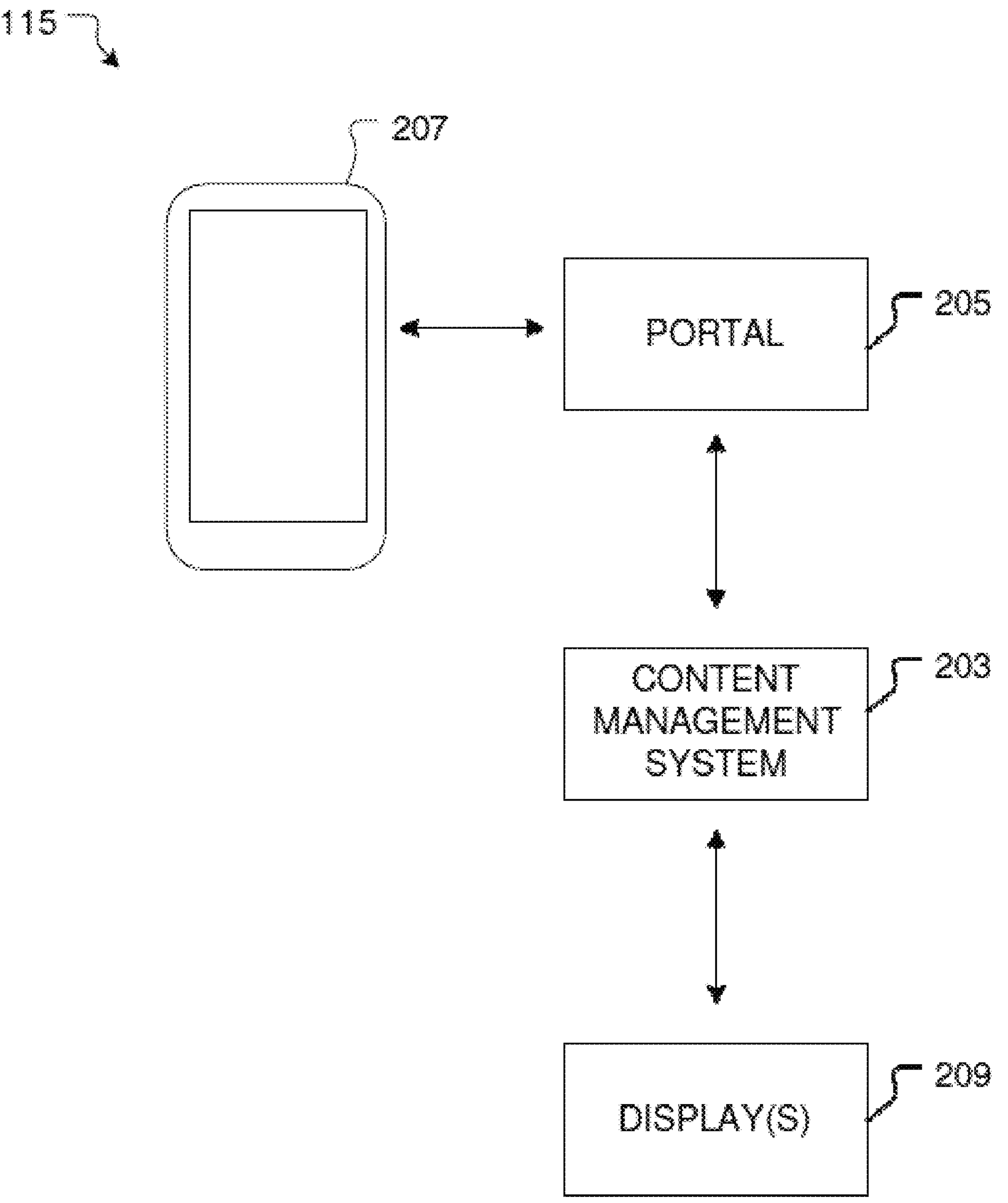
FIG. 2 is a diagram of the control module of the system of FIG. 1.

Referring now to FIG. 2, an example illustration of the control module 115 is further depicted, which may include a content management system (CMS) 203 in digital communication with a portal 205 that is operated by a computing device 207 such as a cellular telephone, tablet, or PC. The portal 205 may allow a user or other source of content to transmit communication content to a display 209, such as the first display 107 or the second display 113. The communication content from the portal 205 may pass through the content management system 203 and then on to the display 209.

In some examples, the displays 209 are partially, if not completely, transparent when seen from inside the vehicle 103, even when content is displayed on the displays 209. This allows the driver or others inside the vehicle 103 to utilize the windows for their primary purpose: viewing the outside world. In other words, even when content (such as advertisements) is displayed on the displays, these displays are completely (or at least partially) transparent when viewed from inside the vehicle such that vision through the window from the inside of the vehicle to the outside is not blocked.

Figure 3:
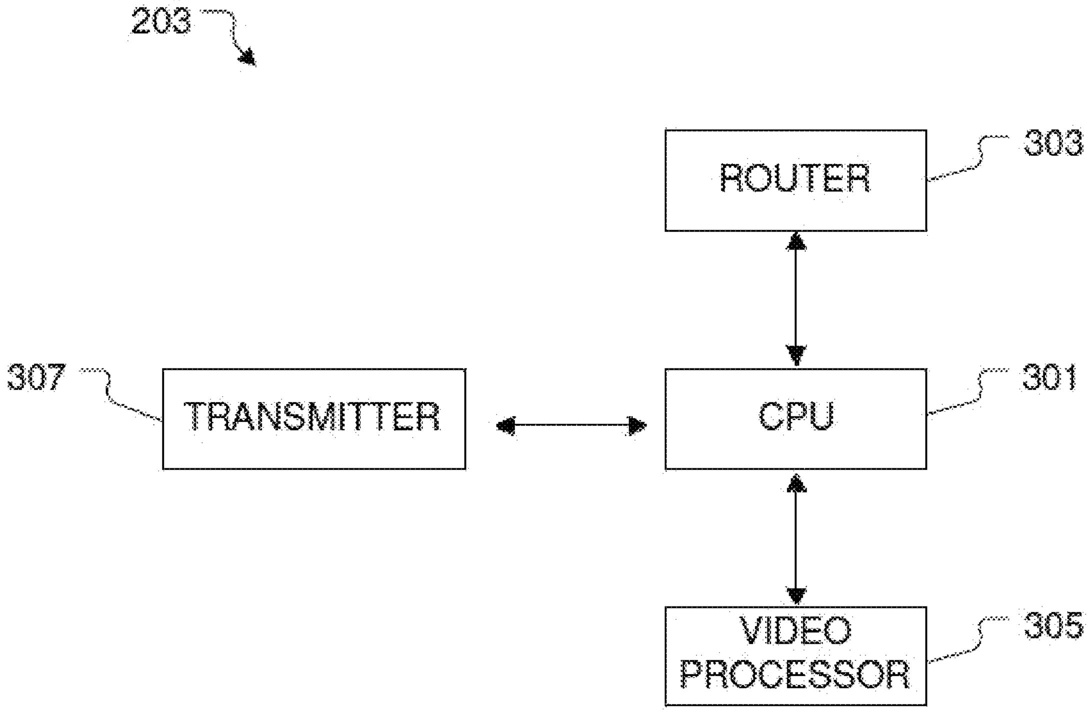
FIG. 3 is a diagram of the content management system of FIG. 2.

An example of the content management system (CMS) 203 is depicted in FIG. 3, which includes a central processing unit (CPU) 301 that processes data from the portal 205, a router 303 protected by a virtual private network (VPN) firewall, and a video processor 305. Data may be moved to and from the CMS 203 via a transmitter 307. The transmitter 307 could be a 4G LTE cellular antenna, 5G cellular antenna, or the like. In one example, the transmitter 307 has a real-time bi-directional feedback protocol that collects environmental data, systems-condition data (i.e., self-diagnostics), and data analytics of the content from the displays 209 and alters the content from the portal 205 dependent thereon. The data transmitted through the transmitter 307 may be protected by digital encryption standards. In addition, the transmitter 307 may allow for content data to be sent to the displays from any location.

In some embodiments, router (303) may include a built-in 256-bit encryption-based VPN firewall configured to block unintended and unscheduled content by third parties. In some embodiments, CMS 203 may operate on a proprietary artificial intelligence algorithm ported platform that interacts with and interprets environmental factors such as weather, precipitation, and air-quality conditions, and display such public informative data on displays, as well as GPS-fed geographical elements for geo-fenced location and demographic appropriate content impressions on displays 209. Additionally, or alternatively, CMS 203 may generate a report of real-time content data such as advertisement impressions and their count. In some embodiments, CMS 203 may be an artificial-intelligence-based automated CMS that supports appropriate content impressions as well as public information notification functions.

In use, content may be sourced by a user through the portal 205. The CMS 203 may then transfer content to the first display 107 and the second display 113, where the content may be seen by people that are outside of the vehicle 103. The CMS 203 may monitor the performance of the displays and the content. The CMS 203 may also alter the content on direction from the portal 205 or based upon criteria programmed within the CMS 203.

In one example, the CMS 203 contains pre-programmed data, accepts real-time updates to the content or pre-programmed data from a remote location, and monitors the reception of the content through data analytics in real-time to improve the effectiveness of the content. In addition, the CMS 203 may self-diagnose any discrepancies in the display of the content or function of the displays in real-time to ensure their proper function. Additionally, as detailed above, the displays 209 do not block vision or sight from inside the vehicle 103 to the outside thereof.

Figure 4:
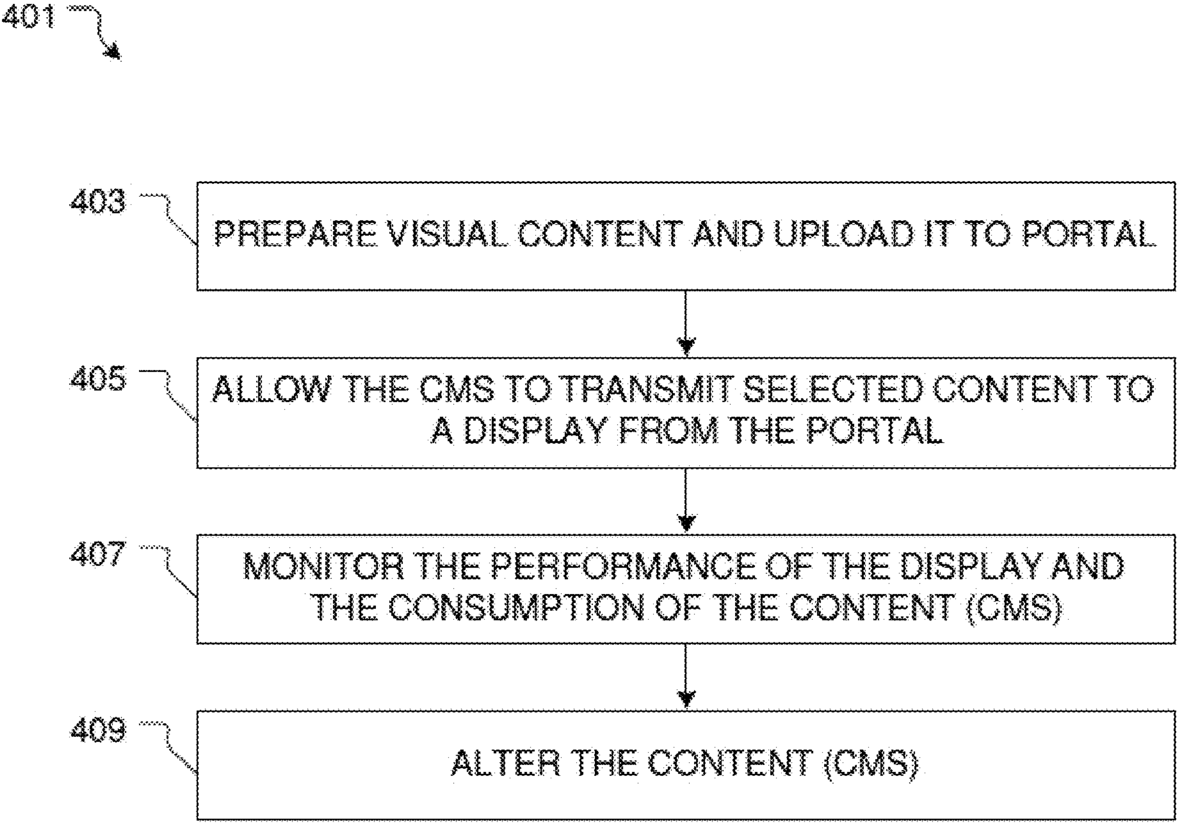
FIG. 4 is a flowchart of a method of displaying communicative information from a vehicle.

Referring now to FIG. 4, an example method of displaying communicative information from a vehicle is depicted. Method 401 includes preparing visual content and uploading it to a portal, such as a CMS platform (step 403), allowing a content management system to transmit select content to a display from the portal (step 405), monitoring, via the CMS, the performance of the display and the consumption of the content (step 407), and altering (via the CMS) the content (step 409).

In one example, the CMS platform is integrated with contracted social media digital advertising platforms as well as e-commerce marketplace advertising platforms so that digital advertisements are auto-populated and auto-rendered on the displays of the system 101, such as via cloud-based and dedicated communication portals between the CMS and the other platforms, as an added digital-advertising service for commercial benefit. In some examples, a digital advertisement may include a QR code.

Figure 5:
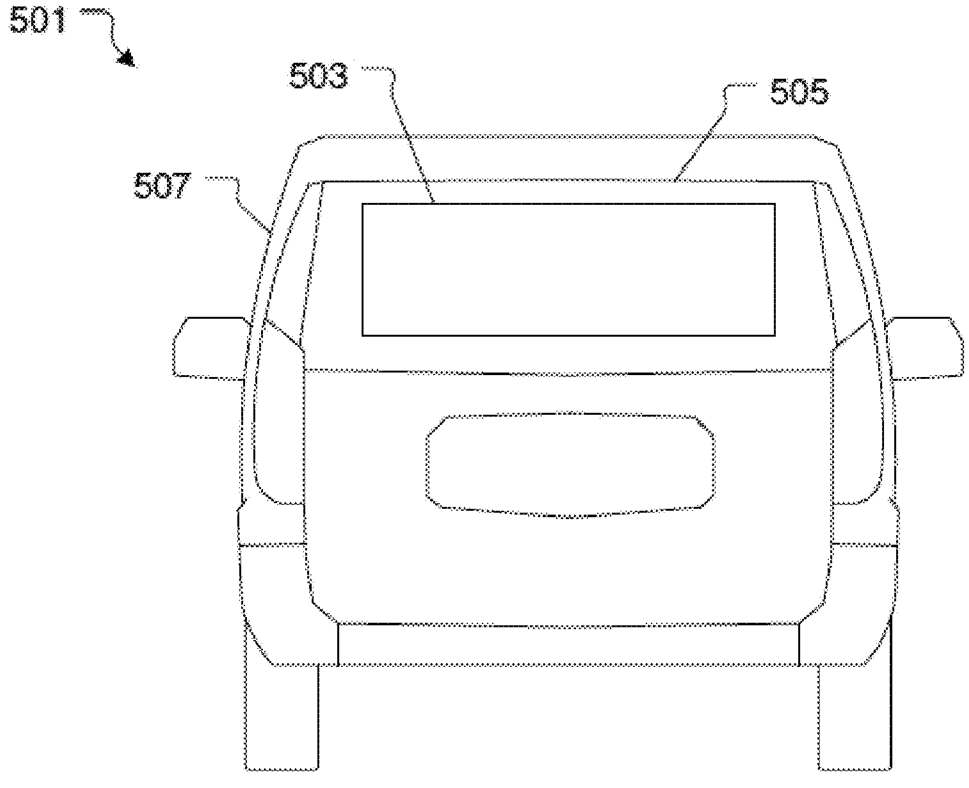
FIGS. 5, 6, 7, and 8 are alternative embodiments of the system of FIG. 1.
Figure 6:
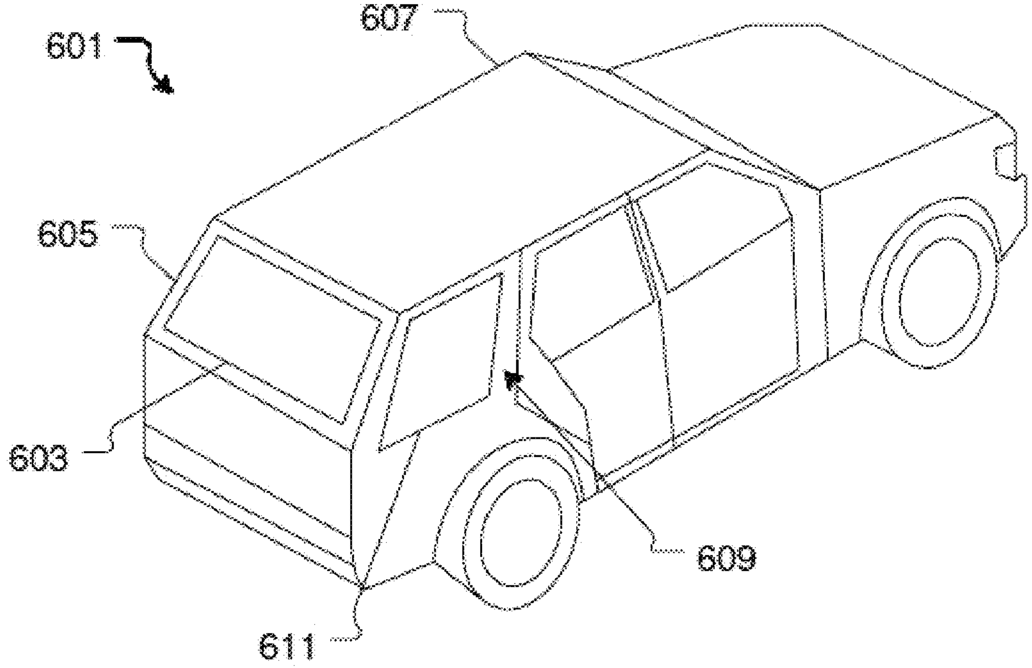
Figure 7:
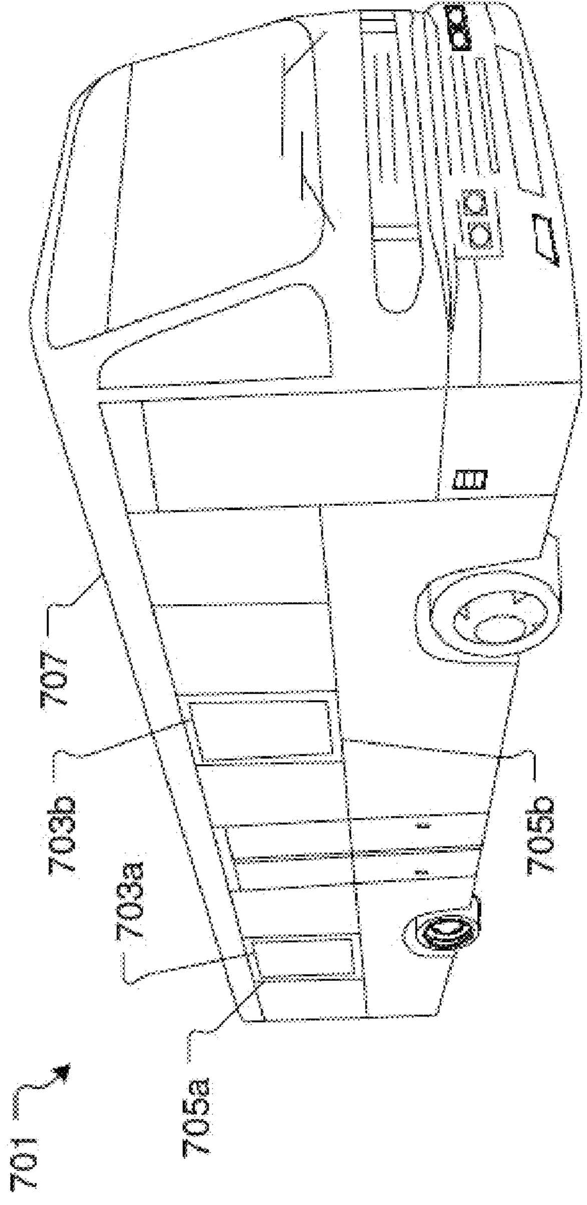
Figure 8:
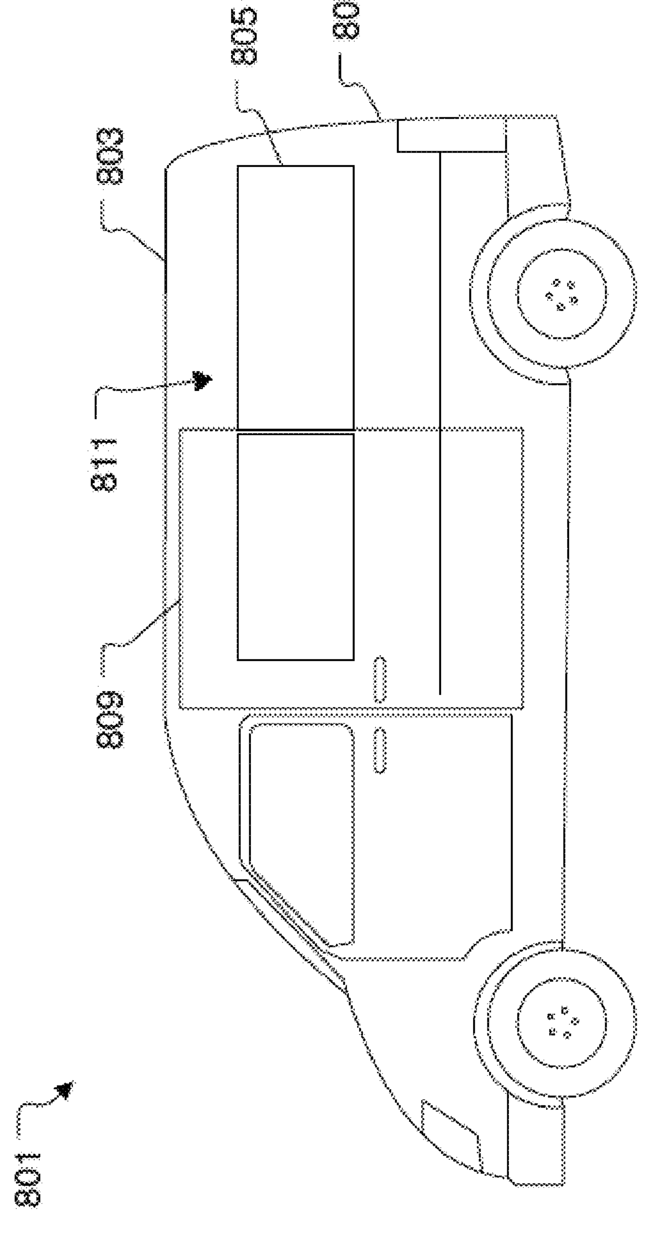

FIGS. 5, 6, 7, and 8 illustrate potential alternative placements or embodiments of the systems described herein. In FIG. 5, embodiment 501 illustrates a truck 507 or van with a rear window 505 through which the driver sees what is behind them. In this example, a see-through display 503 positioned within the field of view of rear window 505 displays content provided by a CMS but does not, due to the see-through nature of the display, obscure or otherwise block the view through the rear window 505. In FIG. 6, embodiment 601 illustrates an SUV 607 with first see-through display 603 positioned within the field of view of a rear window 605 and a see-through second display 611 positioned within the field of view of a side window or panel 609. In FIG. 7, embodiment 701 illustrates a bus 707 or larger vehicle with see-through displays 703 (*a*)-(*b*) positioned within the field of view of multiple windows 705 (*a*)-(*b*). As with prior examples, due to their see-through nature, the see-through displays 703 (*a*)-(*b*) do not block or otherwise obstruct the view from inside the bus 707. In FIG. 8, embodiment 801 illustrates a delivery van 803 that has a solid side and rear surface with no windows, with a display 805 that is attached to the outside surface 811 of a solid side wall 807 and extends to a door 809. A solid rear wall could also have the display 805 attached thereto.

FIGS. 9-15 generally illustrate systems and methods for mounting see-through display screens in vehicles such that the display screens (1) display graphics visible outside of the vehicle but (2) do not interfere with the visibility of drivers and/or passengers inside the vehicle. For example, a display screen may be configured with mounts at the four corners of the display screen that are bolted to the car frame and hold the display screen securely in place near the rear windshield. In other embodiments, a display screen may be configured with mounts at the two bottom corners of the display screen. In some embodiments, this display screen may be a see-through display, such as a transparent LCD, transparent LED display, transparent OLED display, transparent LED-embedded glass display, or the like that is oriented such that the display screen appears transparent from within the vehicle but displays graphics visible outside the vehicle.

A display screen mounted securely to the interior of a vehicle may have numerous advantages over other alternatives, such as being less vulnerable to weather and/or vandalism than an externally mounted display, not interfering with the aerodynamics of the vehicle, displaying graphics and/or messages at eye level to other drivers, and/or being integrated into the visual style of the vehicle.

Figure 9:
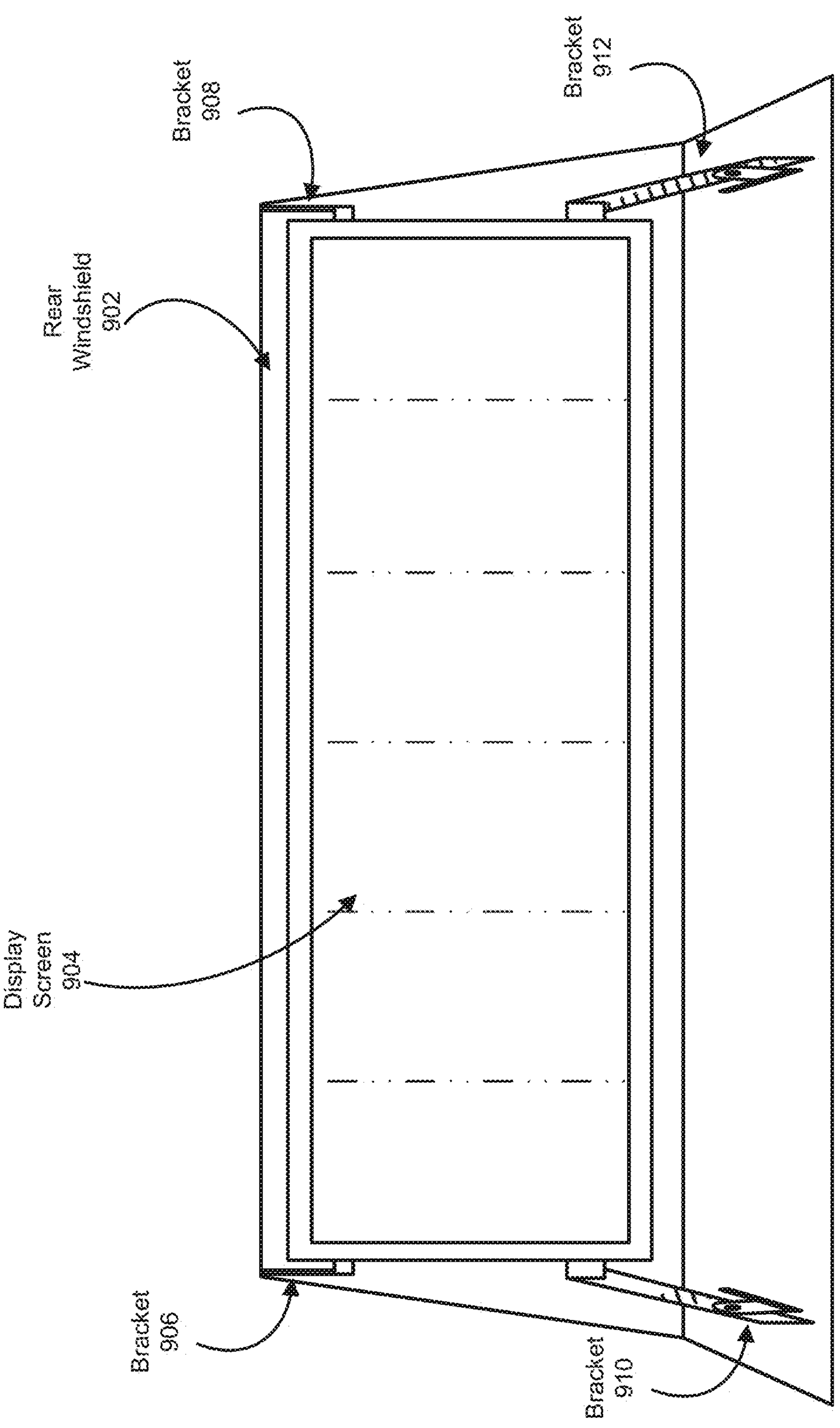
FIG. 9 is an illustration of an exemplary mounting system for display screens in automobiles.
Figure 10:
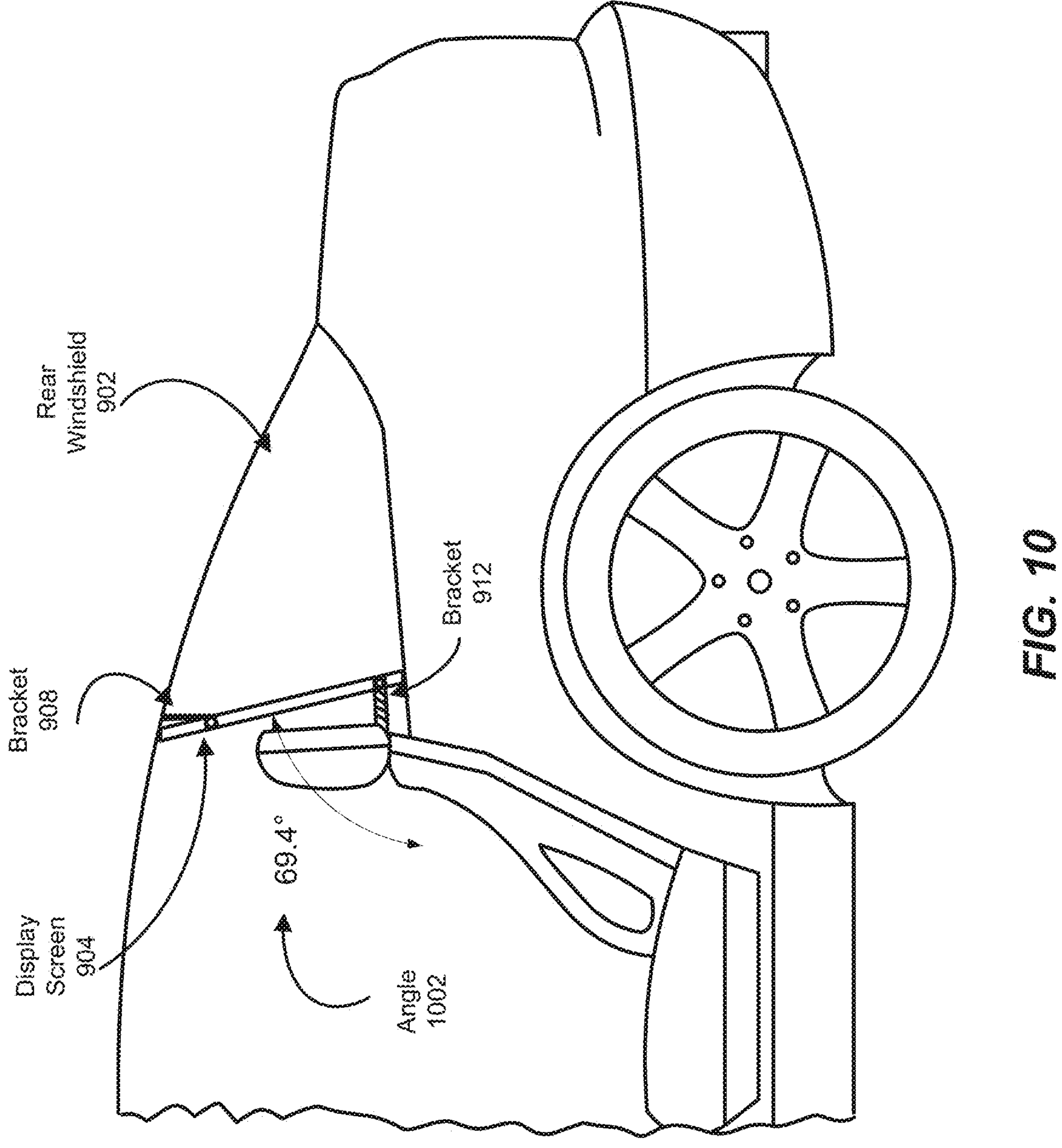
FIG. 10 is an additional illustration of an exemplary mounting system for display screens in automobiles.

In one embodiment, as is illustrated in FIG. 9, the disclosed apparatus may include mounting brackets at the corner or outer regions of a display screen (e.g., four corners of a square or rectangular display screen, outermost curved areas of an oval or circular display screen, etc.). This mounting method may be used, for example, in sedans or other vehicles that do not have a rear door or hatchback. In some embodiments, a see-through display screen 904 may be affixed to be visible through a rear windshield 902 via brackets 906, 908, 910, and/or 912. In one embodiment, brackets 906, 908, 910, and/or 912 may hold display screen 904 at an angle relative to rear windshield 902, as illustrated in FIG. 10. In some embodiments, the brackets may hold the display screen at an angle 1002 that is not perpendicular to the ground (e.g., a 5° angle, a 10° angle, a 15° angle, a 20° angle, a 25° angle, a 30° angle, a 35° angle, a 40° angle, a 45° angle, a 50° angle, a 55° angle, a 60° angle, a 65° angle, a 70° angle, a 75° angle, a 80° angle, a 85° angle, etc.) to optimize the viewing experience of the display screen.

Figure 11:
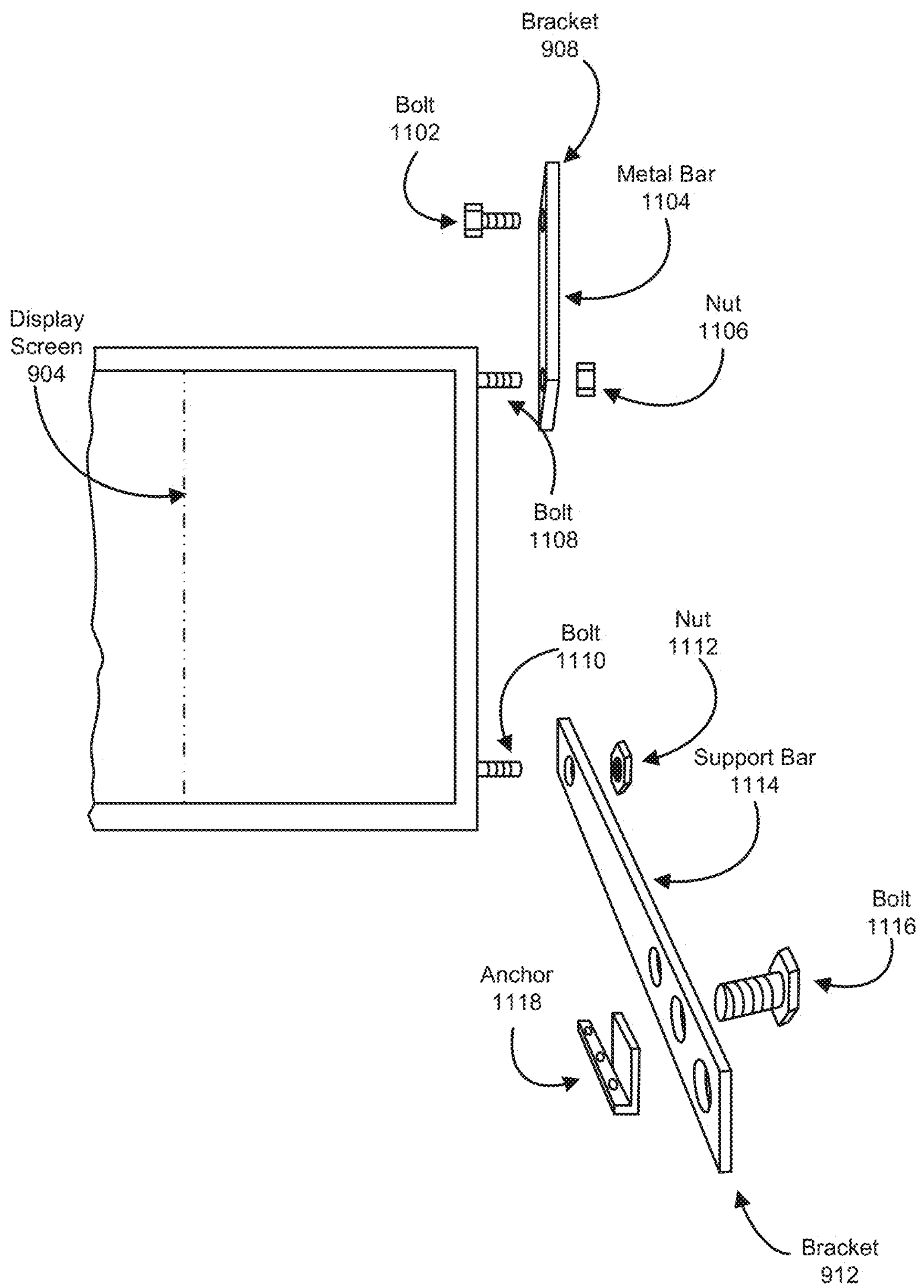
FIG. 11 is an illustration of an additional exemplary mounting system for display screens in automobiles.

In one embodiment, as illustrated in FIG. 11, bracket 908 may include a bolt 1102 that passes through a metal bar 1104 and into the frame of the vehicle and a bolt 1108 that is built into a frame for display screen 904 and secured to metal bar 1104 with a nut 1106. Bracket 906 may be configured similarly. In one embodiment, brackets 906 and/or 908 may be attached to the ceiling of the vehicle and descend vertically to attach to display screen 904. In some embodiments, this configuration of brackets 906 and/or 908 may enable display screen 904 to rotate to achieve an ideal viewing angle through rear windshield 902. In one embodiment, this bracket structure may also facilitate maintenance and/or space savings by enabling display screen 904 to fold upwards.

In some embodiments, bracket 912 may include a bolt 1110 that is built into the frame of display screen 904 and passes through a support bar 1114 before being secured by a nut 1112 as well as a bolt 1116 that passes through support bar 1114 and is secured to an anchor 1118 that is built into and/or affixed to the frame of the vehicle. Bracket 910 may be constructed similarly. In one embodiment, brackets 910 and/or 912 may be affixed to the frame of the vehicle at or near the rear seats of the vehicle and may lie horizontally to attach to display screen 904. In some embodiments, brackets 910 and/or 912 may be lateral movement supports that hold display screen 904 at a fixed angle.

Figure 12:
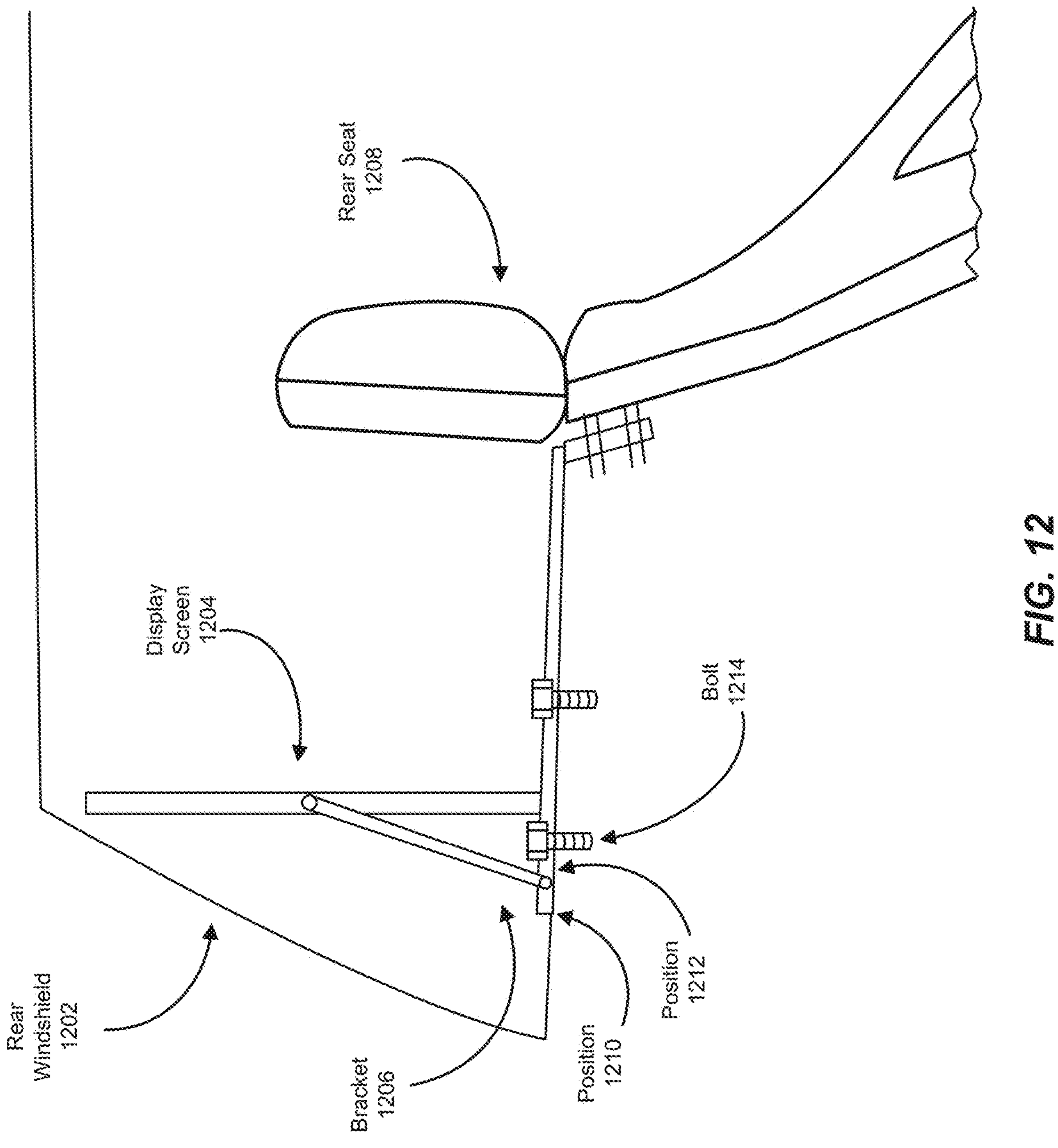
FIG. 12 is an illustration of an additional exemplary mounting system for display screens in automobiles.

Additionally, or alternatively, a display screen mounting system may include one or more brackets (e.g., two) at or near the bottom corner regions of the display screen. This mounting method may be used, for example, in sedans or other vehicles that do not have a rear door or hatchback. For example, as illustrated in FIG. 12, a display screen 1204 may be affixed inside an automobile near a rear windshield 1202 via a bracket 1206 affixed to or near the bottom right corner of display screen 1204 and/or an additional bracket (not shown) affixed to or near the bottom left corner of display screen 1204. In one embodiment, bracket 1206 may be bolted to a frame of display screen 1204 via a diagonal element that is affixed to a horizontal element that is bolted to the frame of the car, rear seat, headrest, etc. In some embodiments, parts of bracket 1206 may be bolted to the frame of the car at or near rear seat 1208. In one embodiment, the diagonal element of bracket 1206 may be able to be affixed to the horizontal element at multiple different positions, such as position 1210 or position 1212, to enable the angle of display screen 1204 to be adjusted. In one embodiment, a bolt 1214 may enable display screen 1204 to be rotated.

Figure 13:
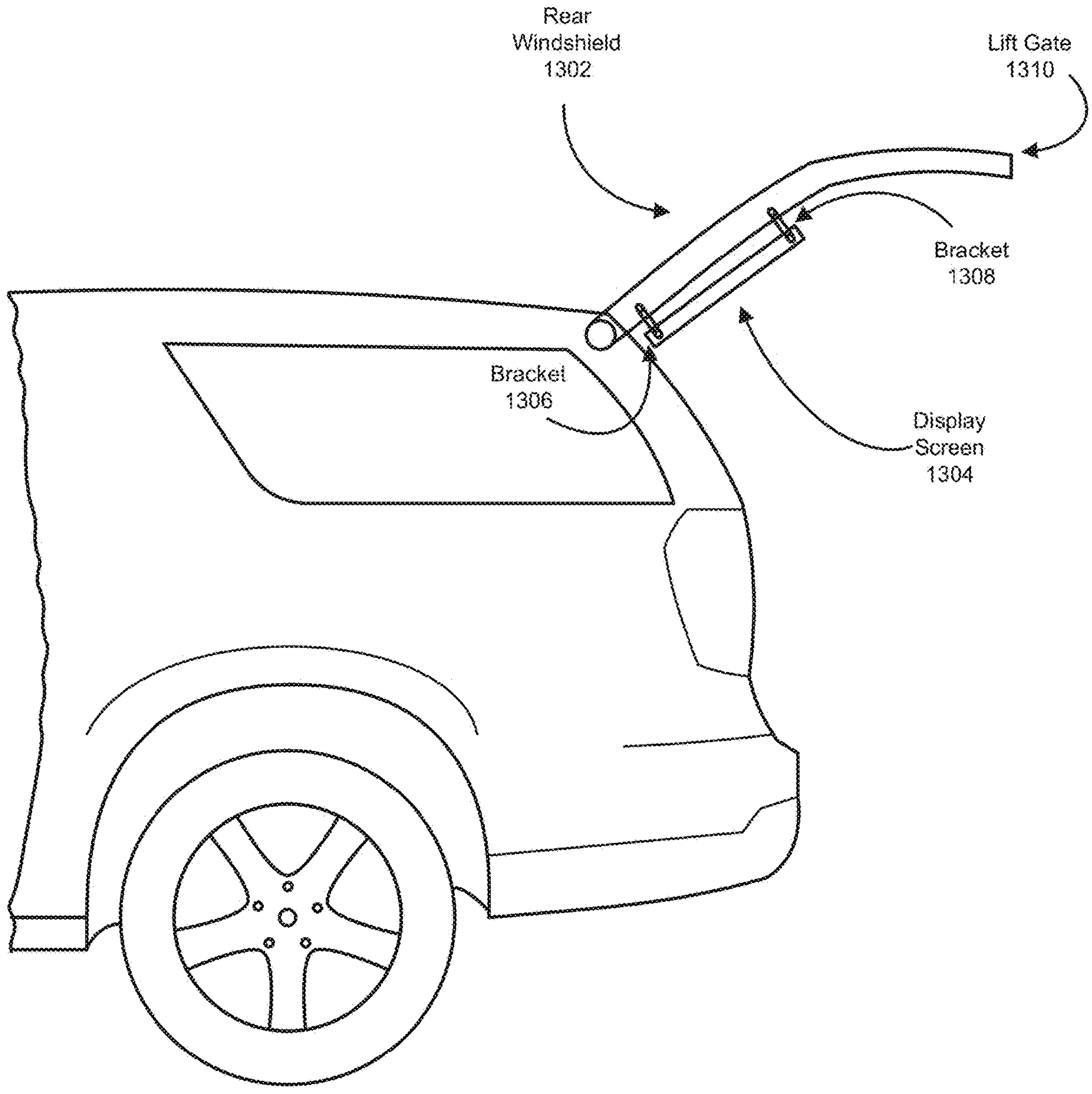
FIG. 13 is an illustration of an additional exemplary mounting system for display screens in automobiles.

In some embodiments, a set of brackets may affix a display screen near the rear windshield of a vehicle with a hatchback or lift gate, such as a sports utility vehicle or van. For example, as illustrated in FIG. 13, a set of four brackets (e.g., bracket 1306, bracket 1308, and two brackets not shown) may securely affix a display screen 1304 such that display screen 1304 is visible through rear windshield 1302 and moves with the motion of lift gate 1310. In some embodiments, brackets 1306 and/or 1308 may include metal bars that connect bolts affixed to the frame of display screen 1304 to bolts anchored to lift gate 1310. In one example, brackets affixed to the top of display screen 1304 such as bracket 1306 may have metal bars with holes in fixed positions while brackets affixed to the bottom of display screen 1304 such as bracket 1308 may be modular brackets with additional hole positions for the bolt affixed to display screen 1304 to enable display screen 1304 to be positioned at various angles relative to rear windshield 1302.

In some embodiments, any or all of the brackets that affix a display screen to a vehicle may have hydraulic elements that cushion the display screen from the motions of the vehicle as the vehicle moves and/or as the lift gate or other doors of a vehicle are opened and closed.

In one embodiment, a set of brackets may affix a display screen to a vehicle near the rear windshield such that the display screen is not in direct physical contact with a defrosting element of the rear windshield. For example, the brackets may position the display screen such that there is a small gap (e.g., less than a half inch) or a large gap (e.g., several inches) between the display screen and the rear windshield that prevents the defrosting element and the display screen from coming into direct physical contact.

Although display screens may be affixed near a rear windshield of a vehicle, such that graphics displayed on the display screen are visible through the rear windshield, similar sets of brackets may position a display screen in front of other windows, such as side windows. For instance, a set of brackets at the four corners of a display screen may affix a display screen near a side window such that graphics displayed on the display screen are visible through the side window from outside the vehicle and the display screen appears at least partially (if not completely) transparent from inside the vehicle.

Though specific configurations of sets of two and four brackets are illustrated, other bracket configurations are also possible. Examples of such bracket configurations include, without limitation, a set of two brackets at diagonally opposite corners of a display screen, three brackets at three corners of a display screen, one or more brackets affixed to the center of the frame of the display screen in place of or in addition to brackets affixed to the corners, and so forth. Additionally, or alternatively, a set of brackets as described above may affix a non-rectangular display screen near a window of an automobile, including but not limited to an oval or circular display screen, a trapezoidal display screen, or a display screen in an irregular shape.

In some embodiments, the see-through display screen may be a transparent LED screen. In one embodiment, the screen may be mounted on a transparent film substrate with LED chips mounted on the same via a surface-mount technology chip mounting process. In some embodiments, the see-through display may emit up to approximately 14,000 or more nits of brightness, sufficient for daytime direct-sunlight content visibility. In one embodiment, the see-through display screen may have an auto-dimming feature provided via an auto-dimming sensor incorporated into the display that modulates the brightness of the display based on ambient light.

In one embodiment, the display screen may be constructed via single-sided electrical current flow to achieve one-way viewing, providing drivers and passengers with an unobstructed and clear view through the display mounted within and in front of one of more windows within a vehicle, such as a rear windshield. In some embodiments, the display screen may be rendered dustproof by a sealant coated LED display surface via a specially designed sealant injection mold.

Figure 14:
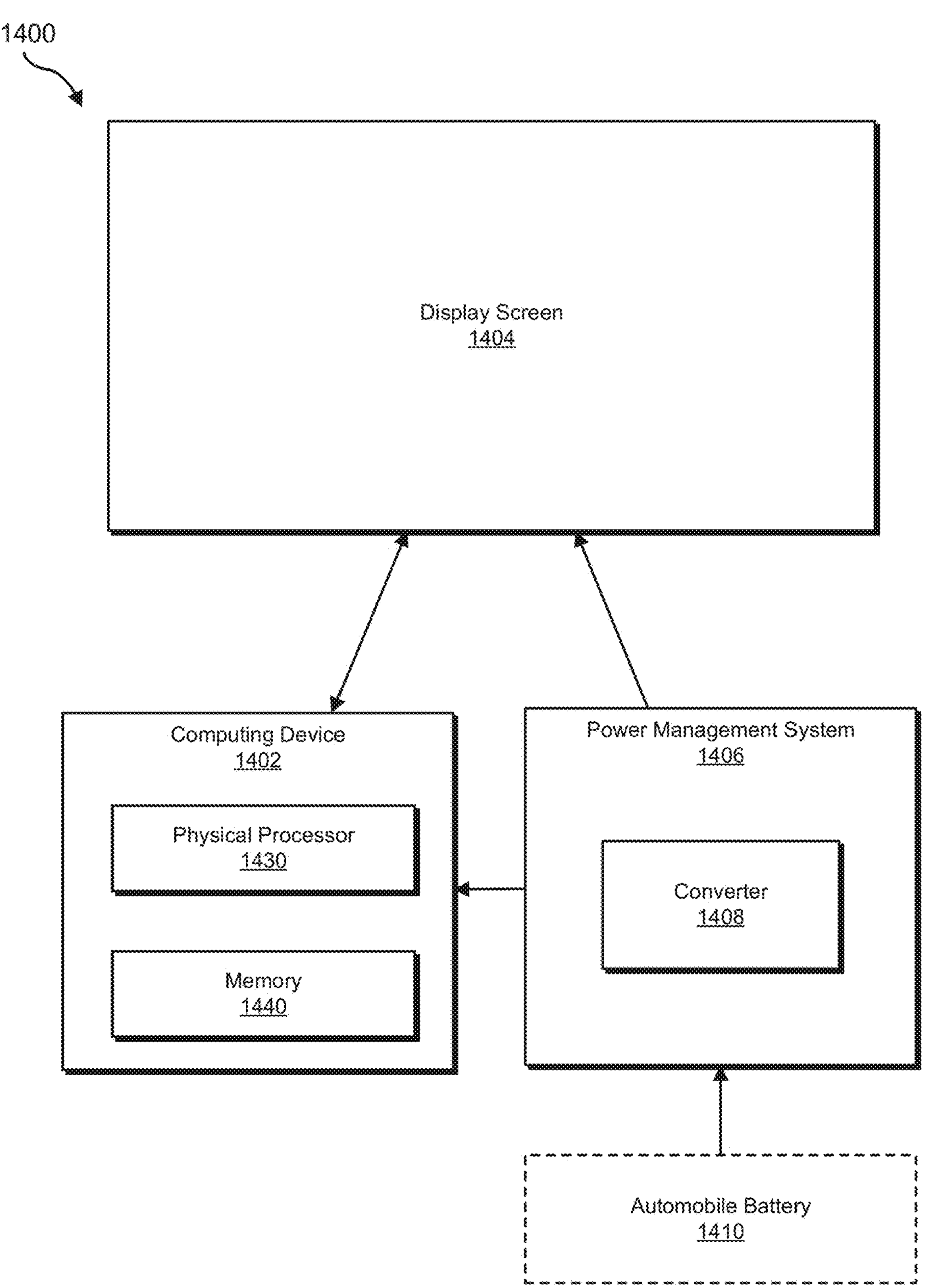
FIG. 14 is a block diagram of an exemplary system for a display screen in an automobile.

In some embodiments, as illustrated in FIG. 14, a system 1400 for a display screen mounted within a vehicle may include a display screen 1404 coupled to a computing device 1402 and/or a power management system 1406.

Computing device 1402 generally represents any type or form of computing device capable of reading computer-executable instructions. For example, computing device 1402 may represent an embedded computing system. Additionally, or alternatively, computing device 1402 may represent an off-the-shelf computing system such as a laptop, tablet, or smartphone. In some embodiments, computing device 1402 may represent a computing system built into the vehicle. Alternatively, computing device 1402 may represent a computing system purpose-built to configure graphics and/or messages displayed on display screen 1404.

As illustrated in FIG. 14, example system 1400 may also include one or more memory devices, such as memory 1440. Memory 1440 generally represents any type or form of volatile or non-volatile storage device or medium capable of storing data and/or computer-readable instructions. In one example, memory 1440 may store, load, and/or maintain one or more software modules. Examples of memory 1440 include, without limitation, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

As illustrated in FIG. 14, example system 1400 may also include one or more physical processors, such as physical processor 1430. Physical processor 1430 generally represents any type or form of hardware-implemented processing unit capable of interpreting and/or executing computer-readable instructions. In one example, physical processor 1430 may access and/or modify one or more of the modules stored in memory 1440. Additionally, or alternatively, physical processor 1430 may execute one or more of the modules. Examples of physical processor 1430 include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

In some embodiments, computing device 1402 may be configured with a video processor, a wireless modem (e.g., a 4G LTE or 5G network-capable wireless modem with virtual private network and/or firewall protection built in), and/or media player software. In one embodiment, the systems described herein may enable a user to configure computing device 1402 with a content library of content to display on display screen 1404. In some examples, computing device 1402 may enable users at remote locations to pre-program and/or pre-schedule specific content into the content library. Content to display on display screen 1404 may include, without limitation, video, images, text, and/or a combination of the above. In some embodiments, computing device 1402 may be configured with software that enables the systems described herein to display specific content at certain times at certain locations, for example by using a router-driven built-in global positioning system with geo-fencing software features. In some embodiments, computing device 1402 may be configured to be capable of performing self-diagnostics of display health such as humidity sensing, impact sensing (e.g., car accidents), and/or power surge sensing.

In some examples, the systems described herein may display real-time public broadcasting content such as public safety alerts, Amber Alerts, and/or other types of emergency broadcasting. In one example, the systems described herein may display driver distress alerts. For example, the systems described herein may display a warning message and/or icon if the driver is driving slowly and attempting to reach the shoulder due to a safety issue such as a blown-out tire. In another example, the systems described herein may display a warning message and/or icon if the driver is having a medical emergency. In some embodiments, the systems described herein may be configured such that public safety alerts override other content (e.g., advertisements, non-severe weather information, etc.). In one example, the systems described herein may be configured to exclusively display public safety information. For example, a police cruiser configured with the systems described herein may display Amber Alerts, severe weather warnings, etc., when such time-sensitive warnings or alerts exist, and may otherwise display a rotating set of public-safety-related messages such as reminders to wear a seatbelt.

In some embodiments, power management system 1406 may provide power to computing device 1402 and/or display screen 1404. In one embodiment, power management system 1406 may be configured with a converter 1408 that may convert power of one current type and/or voltage from automobile battery 1410 into at least one other type of current and/or voltage for computing device 1402 and/or display screen 1404. In one embodiment, power management system 1406 may include multiple converters and may provide power of different current type and/or voltage to computing device 1402 as to display screen 1404. For example, power management system 1406 may be configured with a built-in AC/DC dual inversion system to simultaneously power computing device 1402 with inverted AC current at 110-240 volts as well as display screen 1404 with bypassed DC current at 13 volts, collectively only drawing 11-13 amps from automobile battery 1410. In one embodiment, automobile battery 1410 may represent a manufacturer-provided battery for the vehicle.

Figure 15:
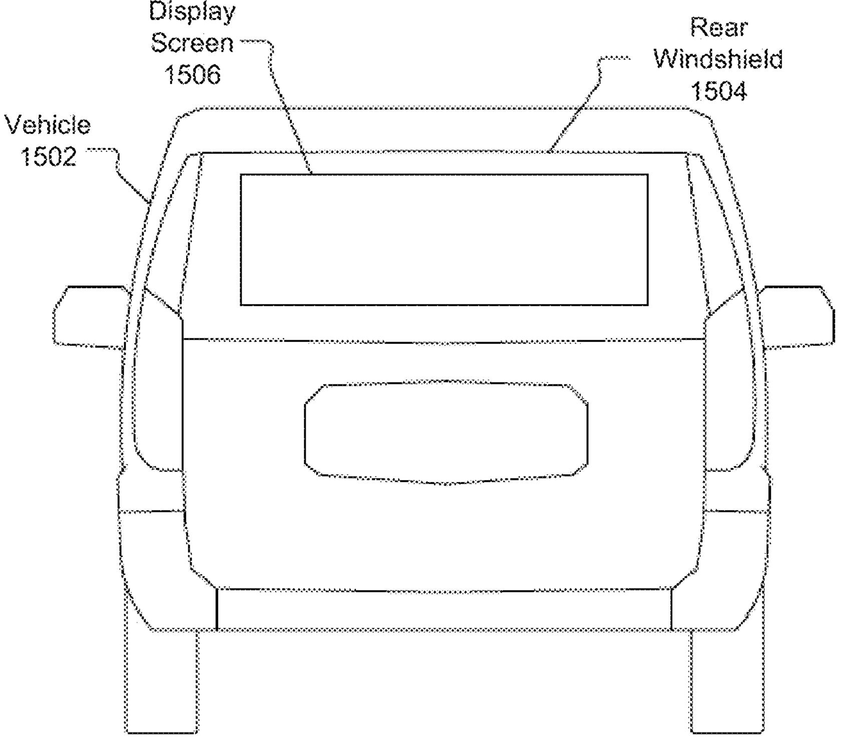
FIG. 15 is an illustration of an external view of an exemplary display screen in an automobile.

In some embodiments, as illustrated in FIG. 15, a display screen 1506 may be visible from the exterior of a vehicle 1502 through a rear windshield 1504 of vehicle 1502. In some examples, display screen 1506 may span the full height and breadth of rear windshield 1504. Alternately, display screen 1506 may span only a portion of rear windshield 1504.

As described above, the systems and methods described herein may enable the mounting of one-way transparent display screens to windows of a vehicle, such as the rear windshield of an automobile. Different configurations of brackets may facilitate mounting in different types of vehicles, such as sedans and sports utility vehicles. By securely mounting one-way transparent LED screens near the windows of vehicles, the systems described may enable the display of messages visible to those outside the vehicle without occluding driver visibility or subjecting the display screen to the risks of weather or vandalism.

EXAMPLE EMBODIMENTS

Example embodiments may include a digital vehicle display system including at least one vehicle, at least one display attached to the at least one vehicles and visible therefrom the outside surface thereof, at least one control module in digital communication with the at least one displays and includes a content management system therein, and at least one portal, where the content management system communicates with the at least one portals to monitor and otherwise alter the content shown by the at least one displays. In one example, the content management system includes a CPU, a router protected by a VPN, firewall, and a video processor.

A digital vehicle display system may also include at least one transparent display attached to a vehicle window, at least one control module in digital communication with the at least one displays and includes a content management system therein, and at least one portal, where the content management system communicates with the at least one portal to monitor and otherwise alter the content shown by the at least one displays. In some examples, the at least one transparent display is attached to side facing or rear windows.

A method of displaying communicative information from a vehicle may include preparing visual content and uploading it to a portal such as a CMS platform, allowing a content management system to transmit select content to a display from the portal, the CMS monitoring the performance of the display and the consumption of the content, and the CMS altering the content.

ADDITIONAL EXAMPLE EMBODIMENTS

1. A digital display system including a display configured to couple to a vehicle such that the display is visible from outside the vehicle, a control module, communicatively coupled with the display, that controls the display, the control module including a content management system and a portal communicatively coupled with the content management system and configured to communicate with at least one device external to the digital display system, where the content management system is configured to communicate with the portal to receive at least one instruction about content to show on the display.

2. The digital display system of example 1, where the display is further configured to couple to a window of the vehicle.

3. The digital display system of examples 1-2, where, when the display is coupled to the window, the display is completely transparent when viewed from inside the vehicle such that vision through the window from the inside of the vehicle to the outside is not blocked.

4. The digital display system of examples 1-3, where, when the display is coupled to the window and content is shown on the display, the display is at least partially transparent when viewed from inside the vehicle such that vision through the window from the inside of the vehicle to the outside is not blocked.

5. The digital display system of examples 1-4, where the content management system further includes pre-programmed data used to determine what content is shown by the display.

6. The digital display system of examples 1-5, where the content management system receives, via the portal, real-time updates to content shown by the display.

7. The digital display system of examples 1-6, where the content management system is configured to communicate, via the portal, with at least one digital advertising platform to receive at least one advertisement to display.

8. The digital display system of examples 1-7, where the content management system includes a central processing unit, a router, and a video processor.

9. The digital display system of examples 1-8, where the display is further configured to couple to at least one of a side-facing window of the vehicle or a rear-facing window of the vehicle.

10. A method including receiving, by a content management system via a portal, visual content for display external to a vehicle by a vehicle-mounted display, selecting, by the content management system, the visual content for display by the vehicle-mounted display, monitoring, by the content management system, display of the visual content, and altering, by the content management system, the visual content responsive to monitoring the display of the visual content.

11. The method of example 10, where monitoring the display of the visual content includes monitoring at least one of systems-condition data or environmental data.

12. The method of examples 10-11, where altering the visual content responsive to monitoring the display of the visual content is responsive to at least one of performance of the display of the visual content as indicated by the systems-condition data or consumption of the visual content as indicated by the environmental data.

13. A digital display system including a display configured to couple to a vehicle window such that the display is visible from outside a vehicle and a control module communicatively coupled with the display that controls the display, the control module including a content management system, where the content management system is configured to receive, via a portal communicatively coupled with the content management system, at least one instruction about content to show on the display.

14. The digital display system of example 13, where, when the display is coupled to the vehicle window, the display is completely transparent when viewed from inside the vehicle such that vision through the vehicle window from the inside of the vehicle to the outside is not blocked.

15. The digital display system of examples 13-14, where, when the display is coupled to the vehicle window and content is shown on the display, the display is at least partially transparent when viewed from inside the vehicle such that vision through the vehicle window from the inside of the vehicle to the outside is not blocked.

16. The digital display system of examples 13-15, where the content management system further includes pre-programmed data used to determine what content is shown by the display.

17. The digital display system of examples 13-16, where the content management system receives, via the portal, real-time updates to content shown by the display.

18. The digital display system of examples 13-17 where the content management system is configured to communicate, via the portal, with at least one digital advertising platform to receive at least one advertisement to display.

19. The digital display system of examples 13-18, where the content management system includes a central processing unit, a router, and a video processor.

20. The digital display system of examples 13-19, where the vehicle window includes at least one of a side-facing vehicle window or a rear-facing vehicle window.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A display screen mount for automobiles comprising a set of mounting brackets with hydraulic elements, wherein each mounting bracket is configured to be affixed at one end to an automobile and at another end to a display screen such that, when the display screen is mounted inside the automobile, graphics displayed on the display screen are visible outside the automobile.

2. The display screen mount for automobiles of claim 1, wherein the display screen comprises a transparent light emitting diode screen.

3. The display screen mount for automobiles of claim 1, wherein the set of mounting brackets is affixed near a rear windshield of the automobile such that the graphics displayed on the display screen are visible through the rear windshield.

4. The display screen mount for automobiles of claim 3, wherein the set of mounting brackets position the display screen such that the display screen is not in direct physical contact with a defroster element of the rear windshield.

5. The display screen mount for automobiles of claim 1, wherein the set of mounting brackets is affixed near a window of the automobile such that the graphics displayed on the display screen are visible through the window and the display is completely transparent when viewed from inside the automobile such that vision through the window from the inside of the automobile to the outside is not blocked.

6. The display screen mount for automobiles of claim 1, wherein the set of mounting brackets comprises four brackets, one affixed near each corner region of the display screen.

7. The display screen mount for automobiles of claim 1, wherein the set of mounting brackets comprises two brackets, each affixed near a bottom corner of the display screen.

8. The display screen mount for automobiles of claim 1, wherein the set of mounting brackets that enable an angle of the display screen to be adjusted while affixed to the set of mounting brackets.

9. The display screen mount for automobiles of claim 1, wherein brackets within the set of mounting brackets, each comprise at least one bolt and at least one anchor point affixed to a frame of the automobile.

10. A system comprising:

a display screen that comprises transparent light-emitting diodes;

a set of mounting brackets, wherein each mounting bracket is configured to be affixed at one end to an automobile and at another end to the display screen such that, when the display screen is mounted inside the automobile, graphics displayed on the display screen are visible outside the automobile; and a power management system that provides power to the display screen.

11. The system of claim 10, wherein the power management system draws power from a battery of the automobile for a display screen comprising transparent light-emitting diodes.

12. The system of claim 10, further comprising a computing system that comprises a software module that transmits graphics to be displayed on the display screen comprising transparent light-emitting diodes.

13. The system of claim 12, wherein the software module comprises an artificial-intelligence-based automated smart content management system (CMS) with remote and real-time data communication capabilities via 4G or 5G cell network by CPU, 256-bit encryption-based VPN firewall protected and hacking-proof wireless router, and video processor for the display screen comprising transparent light-emitting diodes with hydraulic mounting brackets.

14. The system of claim 12, wherein the power management system comprises inverters that enable the power management system to:

provide power to the display screen at a first voltage and a first type of current; and provide power to the computing system at a second voltage and a second type of current.

15. The system of claim 10, wherein the display screen comprising transparent light-emitting diodes is constructed and mounted in the field of view of a window of the automobile such the display screen displays images that are visible outside the automobile but appear transparent from within the automobile such that vision through the window from the inside of the automobile to the outside is not blocked.

16. The system of claim 10, wherein the set of mounting brackets comprise modular brackets that enable an angle of the display screen to be adjusted while affixed to the set of mounting brackets.

17. A system comprising:

at least one physical processor; and physical memory comprising computer-executable instructions that, when executed by the physical processor, cause the physical processor to transmit graphics for display on a transparent light-emitting diode screen that is mounted via a set of mounting brackets, wherein each mounting bracket is configured to be affixed at one end to an automobile and at another end to a display screen such that, when the display screen is mounted inside the automobile, graphics displayed on the display screen are visible outside the automobile.

18. The system of claim 17, further comprising a power management system that draws power from a battery of the automobile and provides power to both the physical processor and the transparent light-emitting diode screen.

19. The system of claim 13, further comprising such artificial-intelligence powered and self-diagnostics capable Smart-CMS (Content Management System) features as real-time and precise-location notifications of disabled displays by impact, precipitation, overheating, obstruction by foreign objects or debris, or wire connectivity impairment, as enabled by built-in sensors and GPS programming.

20. The system of claim 19, further comprising a proprietary artificial intelligence algorithm ported platform with GPS-fed geofencing capabilities that interact with and interpret environmental factors such as weather, precipitation, and air-quality conditions to display such public information data as well as real-time linked public safety agency notifications on displays such as Weather and Natural Disaster and Evacuation Alerts, Amber Alerts, Terrorism Alerts, or Human Trafficking Alerts, as well as other general public safety alerts related to school-zone driving safety, wearing seatbelts, no texting and driving, or no drinking and driving. Additionally to further GPS-fed geofencing capabilities, the proprietary artificial intelligence algorithm ported platform and software programming of the Smart-CMS is automatically triggered, as a way of public hyper-marketing, to display such geographic-data appropriate, environment-data appropriate, and demographic-data appropriate graphics contents or advertisements on displays as hospitals, pharmacies, restaurants, coffee shops, stores, and other public venues, as well as social media or e-commerce links via scannable QR codes to render appropriate and beneficial services to public, wherein such functional-content capabilities on displays in the field can be monitored remotely at real time.

* * * * *